UNITED STATES PATENT OFFICE.

PAUL HERMANN KAUSCHKE, OF FREIBERG, GERMANY.

PROCESS OF COLORING LEATHER.

SPECIFICATION forming part of Letters Patent No. 641,394, dated January 16, 1900.

Application filed September 8, 1899. Serial No. 729,879. (No specimens.)

*To all whom it may concern:*

Be it known that I, PAUL HERMANN KAUSCHKE, a subject of the King of Prussia, German Emperor, residing at Freiberg, Saxony, Empire of Germany, have invented a certain new and useful Improved Process for Coloring Leather, (for which application for Letters Patent has been made in Germany, filed in February, 1899, in the days between the 1st and 15th, I being unable to recollect the true date,) of which the following is a specification.

I have observed that vegetable tanning substances will unite with diazo bodies and so united form coloring-matters. This is in accordance with the general law that phenol (tanning substances, such as aromatic oxycarbon acids, being distinguished by properties characteristic of phenol) will react with diazo substances and form oxyazo combinations, which represent coloring substances in the presence of auxochrome groups. When a diazo solution is made to react on tanning substances, a coloring substance of a yellow, red, or brown tint is produced, according to the nature of the components, which coloring substances are very superior as regards their coloring power, permanency against light action, resistance against acids or alkalies, as well as from the point of view of their simple and inexpensive mode of production, these qualities insuring very great advantages in practical use as compared with the use of the known tar-coloring substances. The coloring substance in question, which is insoluble, is produced on the leather itself in a manner similar to that frequently used in coloring cotton materials—viz., by coating it with or simply dipping it into a solution of a suitable diazo compound. When the diazo solution, which is produced in the known manner by treating amin with nitrite and a mineral acid, is used directly or, as in the case of dyeing textile fabrics, after adding acetate of sodium, a dye will be produced, but of so uneven a tint as to be commercially valueless. I have, however, discovered that this drawback can be overcome by treating the diazo solution with an excess of carbonate of lime, so as to neutralize the mineral acid. Such neutral diazo solutions produce very fine and perfectly even dyeing effects. When it is required to store or keep the solution, it is advisable to render it acid by the addition of acetic acid, so as to retard decomposition, which is very rapid in a neutral solution, the presence of the acid not, as I have proved, affecting the dye.

The mode of operation therefore is as follows:

*1. Preparation of leather.*—The tanned leather is for a short time—say fifteen minutes—washed in tepid water, after which it is ready to be dyed at once. Chrome leather, or leather that has been tanned by other than vegetable tanning substances, is subjected to a supplementary process of tanning with a vegetable tanning substance, being treated in a 2° to 8° Baumé solution of the latter for about fifteen to twenty minutes, after which it is rinsed and dyed as in the first case.

*2. Preparation of the dyeing liquid.*—Corresponding to the formula, for example, of

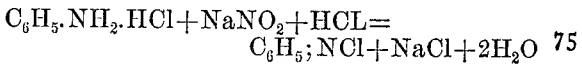

a molecule of each hydrochlorate of amin, sodium nitrite, and diluted hydrochloric acid is mixed cold. The diazo solution thus obtained is treated with a molecule (and a slight excess) of carbonate of lime for the purpose of neutralizing the hydrochloric acid and then eventually with acetic acid until an acid reaction is given if it is desired to store or keep the solution. The solution thus obtained is diluted to the extent calculated to produce the required tint or intensity of the dye. On an average one hundred to two hundred grams of an amin hydrochlorate may be used for every one hundred liters of the dyeing liquid. For instance, the following solution will be found serviceable for dyeing:

First. Yellow: Two hundred and thirteen grams sulfanilate of sodium to ten liters of water, to which is added four hundred and thirty grams of hydrochloric acid (twenty-five per cent.) and a solution of seventy grams of sodium nitrite in one liter of water. After some time and while constantly stirring is added one hundred and twenty grams of carbonate of lime and eventually one hundred to one hundred and fifty cubic centimeters of acetic acid, (thirty per cent.) Finally the whole is diluted with cold water, so as to form one hundred liters of the solution.

Second. Brownish yellow: Dissolve one hundred and thirty grams anilin chlorhydrate and seventy grams of sodium nitrite in ten liters of water, and add one hundred and forty-five grams of hydrochloric acid, (twenty-five per cent.,) neutralize and dilute as before.

Third. Orange: A solution consisting of two hundred and fifteen grams of $\alpha$- (or $\beta$-) naphthylamin chlorhydrate and one hundred and forty-five grams of hydrochloric acid in ten liters of water is mixed with a solution of seventy grams of sodium nitrite in one liter of water, continuing as above.

Fourth. Red: To a solution of one hundred and eighty-five grams of benzidin and five hundred and eighty grams of hydrochloric acid (twenty-five per cent.) in twenty liters of water add one hundred and forty grams of sodium nitrite, dissolved in one liter of water, and neutralize as before.

In each case add as much water as to obtain one hundred liters of the solution, or more or less, according to the intensity of color required.

*3. Dyeing the leather.*—The leather prepared as described in Example 1 is in the manner known either dipped into the solution or painted with it or permeated with it. It should be observed that the solution should be used at the ordinary temperature. For the purpose of obtaining intermediate-color tints solutions may be mixed together in varying proportions as well as with many of the tar-coloring substances. Should darker and less bright colors be required, the leather may be treated with iron, chrome, and other salts in the well-known manner.

In the foregoing specification the term "hydrochlorate" and "chlorhydrate" are equivalent to each other and are synonymous with the terms "chlorhydrid" and "hydrochlorid."

I claim—

1. A process for coloring vegetable tanned leather consisting in neutralizing a diazo solution with carbonate of lime, and afterward rendering it acid again by the addition of a suitable acid applying the solution in a dilute form to the leather, causing a chemical reaction with the vegetable tanning material precipitated in the leather, whereby the dyeing is effected, substantially as described.

2. A process for coloring vegetable tanned leather consisting in neutralizing a diazo solution with carbonate of lime and afterward rendering it acid by the addition of a suitable acid, and applying the solution mixed with a proportion of tar-coloring material to the leather, substantially as described.

3. The process of coloring vegetable tanned leather consisting in subjecting the leather to a neutralized diazo solution; substantially as described.

4. The process of coloring vegetable tanned leather consisting in subjecting the leather to a diazo solution neutralized with carbonate of lime; substantially as described.

PAUL HERMANN KAUSCHKE.

Witnesses:
 OTTO WOLFF,
 C. FRANZ DUMMER.